United States Patent [19]
Twilley et al.

[11] Patent Number: 5,518,454
[45] Date of Patent: May 21, 1996

[54] RESEARCH PLOT HARVESTER WITH UNCONVENTIONAL GRAIN FLOW

[75] Inventors: Clarence H. Twilley, Ames; Scott E. Alley; John M. Gass, both of Slater; John W. Fisher, Iowa City; Kevin W. Meier, Ogden, all of Iowa

[73] Assignee: Zeheca Limited, London, England

[21] Appl. No.: 334,746

[22] Filed: Nov. 4, 1994

[51] Int. Cl.[6] .................................................. A01F 12/50
[52] U.S. Cl. ............................ 460/7; 56/10.2 B; 460/119
[58] Field of Search .................................... 460/7, 8, 1, 4, 460/5, 6, 119, 149, 150; 56/10.2 B

[56] References Cited

U.S. PATENT DOCUMENTS

| | | | |
|---|---|---|---|
| 5,282,389 | 2/1994 | Faivre et al. | 460/1 X |
| 5,318,475 | 6/1994 | Schrock et al. | 460/6 X |
| 5,327,708 | 7/1994 | Gerrish | 460/7 X |

OTHER PUBLICATIONS

Moisture Control Systems, Inc., flyer. (Date Unknown).
Moisture Control Systems, Inc., comparison flyer from Carter. (Date Unknown).
Almaco Catalog, 1993. pp. 9–11.
Almaco Seed Spector flyer. (Date Unknown).
Plotscribe flyer, Carter Manufacturing Co., Inc. (Date Unknown).
Moisture and Weight Data Gathering Systems flyer, Carter Manufacturing Co., Inc. (Date Unknown).
Micro 4 flyer, MCS Inc. (Data Unknown).

*Primary Examiner*—Terry Lee Melius
*Attorney, Agent, or Firm*—Dana Rewoldt

[57] ABSTRACT

A harvester with unconventional grain flow for collecting and measuring grain grown on strip test plots. A conventional harvester having a weigh bucket for measuring grain located at a high position is modified by reversing the grain flow of a lateral conveyor and locating the weigh bucket at a low position inside the vertical confines of the harvester. The modified grain path upstream of the weigh bucket reduces the time required to move harvested grain to the weigh bucket and thus the waiting time required between harvesting of successive strip plot tests.

18 Claims, 8 Drawing Sheets

RESEARCH PLOT HARVESTER WITH UNCONVENTIONAL GRAIN FLOW

BACKGROUND OF THE INVENTION

The invention relates generally to harvesters and, more particularly, to a combine for harvesting row crops which has been modified to collect and measure grain from small strip test plots.

It is common in the seed industry to grow and collect data on a large number of test varieties to evaluate the individual varieties for possible advancement toward commercialization. Frequently, each variety being evaluated is grown at a plurality of locations to collect data under a range of growing conditions. Among the data collected are the weight of the grain harvested from the strip test plots and the moisture of the grain at harvest. Each strip test plot typically consists of one or several rows of a length of approximately 20 feet.

It is known in the prior art to modify conventional harvesters by the addition of a weigh bucket which receives and weighs the grain collected off of each strip test plot, measures the moisture of a sample of the collected grain, and then discharges the grain into a bulk reservoir where it is commingled with grain harvested off of other strip test plots. The data collected is typically stored in a local memory device for subsequent processing.

The process of measuring and collecting grain begins with the advancement of the harvester through the strip test plot, and then stopping the harvester at the end of the strip test plot, measuring the collected grain and then beginning advancement into the adjacent strip test plot. The ground travel of the harvester is stopped while the threshing and cleaning action of the harvester is continued in order to process the entire quantity of grain collected through the harvester for delivery to the weigh bucket. After all of the grain collected off of the subject strip test plot has been processed and delivered to the weigh bucket, the harvester can then be advanced into the next strip test plot. The dwell time between strip test plots is, accordingly, a function of how quickly the collected grain is threshed and cleaned by the harvester and conveyed to the weigh bucket.

Most harvesters have the clean grain tank positioned at the top of the harvester. It is common to position the weigh bucket above the clean grain reservoir so that it will discharge directly into the reservoir after the grain has been measured. This positioning of the weigh bucket increases substantially the already tall height of the harvester with the result that the weigh bucket must be moved from its operative position or totally removed to permit the harvester to comply with federal regulations for travel on the highway and to pass through the door of machine sheds or other equipment shelters.

SUMMARY OF THE INVENTION

The invention consists of a conventional grain harvester which has been modified to harvest grain off of strip test plots, weigh the grain collected, measure the moisture content of a sample of the grain collected, and record the information for subsequent processing. A weigh bucket is mounted to the harvester at a position inside the vertical confines of the harvester. The grain path of the harvester is altered to direct clean grain into the weigh bucket at a point early in the path of clean grain from the threshing operations of the harvester. Data collected by the weigh bucket is sent to a small computer positioned in the operator cab of the harvester while the sensor and weigh bucket control electronics are located near the weigh bucket to reduce the amount of wiring required, thereby easing installation effort and reducing cost. By reducing the length of small-signal bearing wire, the problem of electrical interference is reduced and the potential for damage to the wiring is decreased.

In a particular application, the conventional harvester has a lateral clean grain conveyor which moves clean grain to a first side of the harvester. The grain is then fed into a vertical conveyor which transports the grain upwardly for discharge into a weigh bucket positioned above the clean grain tank. Grain from each strip test plot must be conveyed the entire distance of the lateral and vertical conveyors before it is collected in the weigh bucket for measurement. According to the present invention, the harvester is modified by reversing the direction of the lateral conveyor so that clean grain is first conveyed to the opposite side of the harvester. A relatively short vertical conveyor then transports the grain upwardly for discharge into a weigh bucket positioned at a relatively low point on the same side of the harvester. When the grain has been measured by the weigh bucket, it is discharged into a second lateral conveyor which moves it to the first side of the harvester to a second vertical conveyor which transports the clean grain to the clean grain tank. Positioning the weigh bucket at a low position decreases the amount of time required to transport the clean grain into the weigh bucket for measuring and so reduces concomitantly the dwell time of the harvester required between adjacent strip test plots.

An object of the invention is to provide a harvester for collecting and measuring grain from strip test plots which substantially reduces the amount of time required to collect and measure grain from each strip test plot.

Another object of the invention is to provide a strip test plot harvester wherein the weigh bucket is positioned within the vertical and transverse confines of the harvester.

A further object of the invention is to provide a strip test plot harvester wherein the sensor and control electronics of the grain measuring apparatus is located near the grain measuring apparatus whereas means for recording collected data is located in the operator's cab.

These and other objects of the invention will be understood by a person of skill in the art upon a review of the specification, associated drawings, and appended claims.

BRIEF DESCRIPTION OF THE DRAWINGS

FIGS. 6A and 6B are perspective views of a sample bucket positioned inside the weigh bucket wherein FIG. 6A shows the condition immediately after grain has been discharged into the weigh bucket and FIG. 6B shows the condition after the grain the sample bucket has been leveled.

DETAILED DESCRIPTION OF A PREFERRED EMBODIMENT

Figure 1:
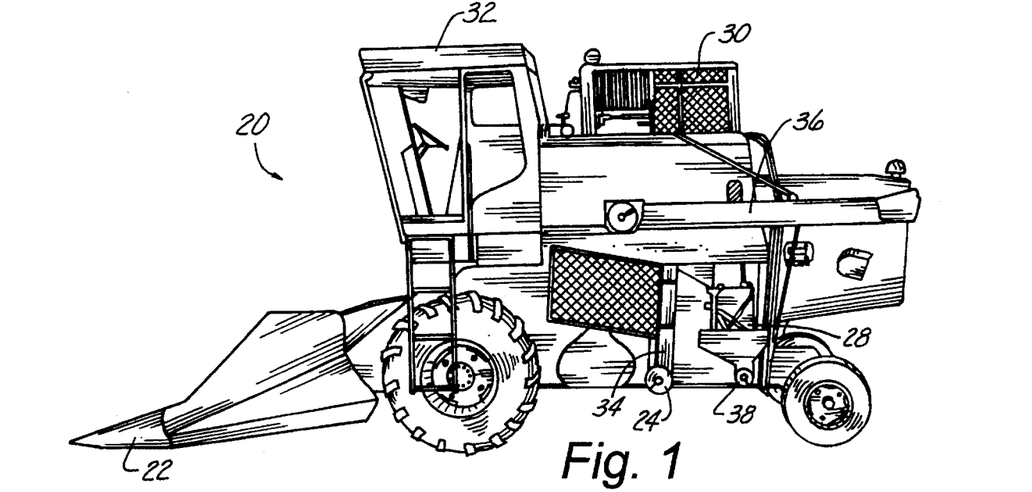
FIG. 1 is a side elevational view of a harvester of the present invention.

Referring to FIG. 1 there is illustrated, generally at 20, a row crop combine harvester which incorporates the present invention. The harvester 20 in the preferred embodiment is a John Deere model 3300, although the teachings of the invention can be applied to other harvesters as well. The harvester 20 in the preferred embodiment includes a corn head 22 for the harvesting of corn grown in rows. The corn head 22 of the preferred embodiment accommodates the simultaneous harvesting of grain from four rows. Alternatively, if the crop to be harvested was, for example, soybeans, a bean head (not shown) of the usual construction would be attached to the harvester 20 in place of the corn head 22.

The basic functions of the harvester 20 through the process of cleaning the grain is identical to that of the John Deere 3300 combine harvester as supplied from the factory. Briefly, the harvester 20 is placed into operation and advanced into the rows of crop to be harvested. In the case of corn, the corn head separates the ears of corn from the stalks. Corn ears move to a shelling or threshing operation where the kernels of corn are separated from the cob. Chaff and other debris is then separated from the corn kernels which are then referred to as clean grain.

Figure 7A:
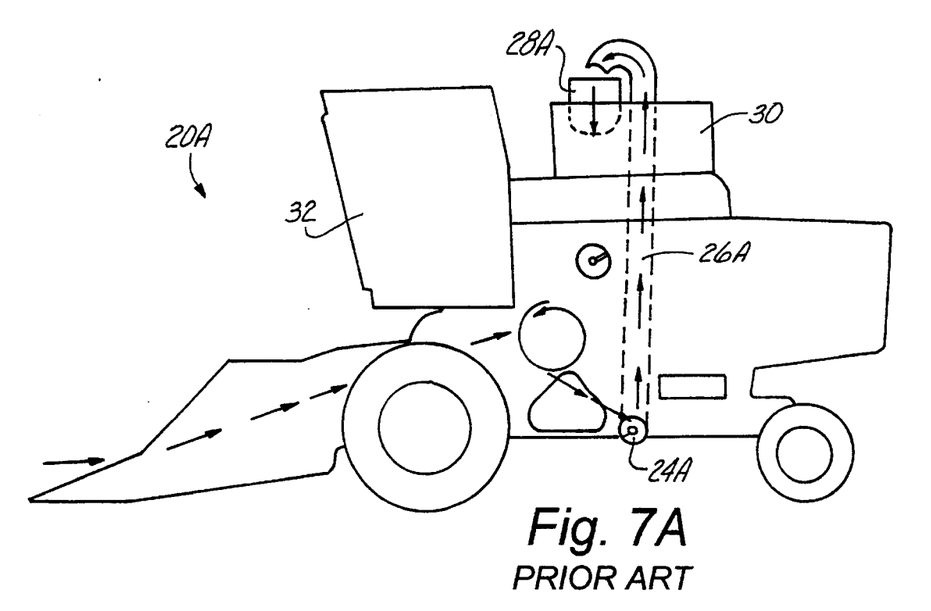
FIGS. 7A and 7B are side and top views, respectively, of a conventional harvester showing in schematic form the grain path through the conventional harvester.
Figure 7B:
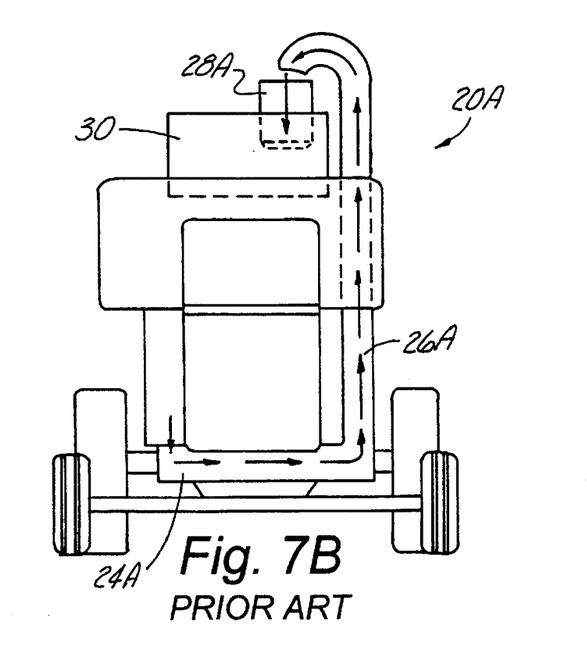

In the case of corn, strip test plots consist of one or more parallel rows of an individual variety being studied. The strip test plots are small, with rows typically on the order of 20 feet in length. The strip test plots are planted so that a gap of approximately 3 feet is created between successive strip test plots. At harvest time, a combine harvester is used to collect and measure the grain produced on each of the individual strip test plots. A John Deere Model 3300 harvester which has been modified under prior art techniques to collect and measure grain from strip test plots is illustrated generally at 20A in FIGS. 7A and 7B. The arrows in FIGS. 7A and 7B show a generalized grain path through the prior art harvester 20A. After the grain has been husked, shelled, and cleaned, it is delivered to a lateral conveyor 24A which transports the grain to the right side of the harvester 20A. The clean grain is then transported upwardly by a vertical conveyor 26A and is discharged into a weigh bucket 28A that is positioned above a clean grain reservoir or tank 30. The weigh bucket of the preferred embodiment is available from Carter Manufacturing although the teachings of the invention can be applied to other weigh bucket as well.

The collecting and measuring process of each strip test plot begins with positioning the harvester 20A at the beginning of the strip test plot to be harvested. The harvester 20A is then advanced through the strip test plot and its ground travel stopped when the entire strip test plot has been harvested but before the grain growing on the succeeding strip test plot is harvested. The harvester 20A is held stationary while the grain is husked, shelled, and cleaned, and conveyed into the weigh bucket 28A. When the entire volume of grain collected off of the strip test plot is in the weigh bucket 28A, the grain is weighed and a sample is tested for its moisture content. This data is typically stored in an electronic memory device in an operator's cab 32 of the harvester 20A. After the operator of the harvester 20A has determined that all of the grain from the first strip test plot has been conveyed to the weigh bucket 28A, the harvester 20A is then advanced into the succeeding strip test plot. The dwell time required between successive strip test plots is determined by the speed of the harvester 20A in processing the grain and transporting the cleaned grain to the weigh bucket. Specifically, for a John Deere Model 3300 incorporating the prior art technique as illustrated in FIGS. 7A and 7B, the dwell time is between about 10 and about 20 seconds.

Figure 8A:
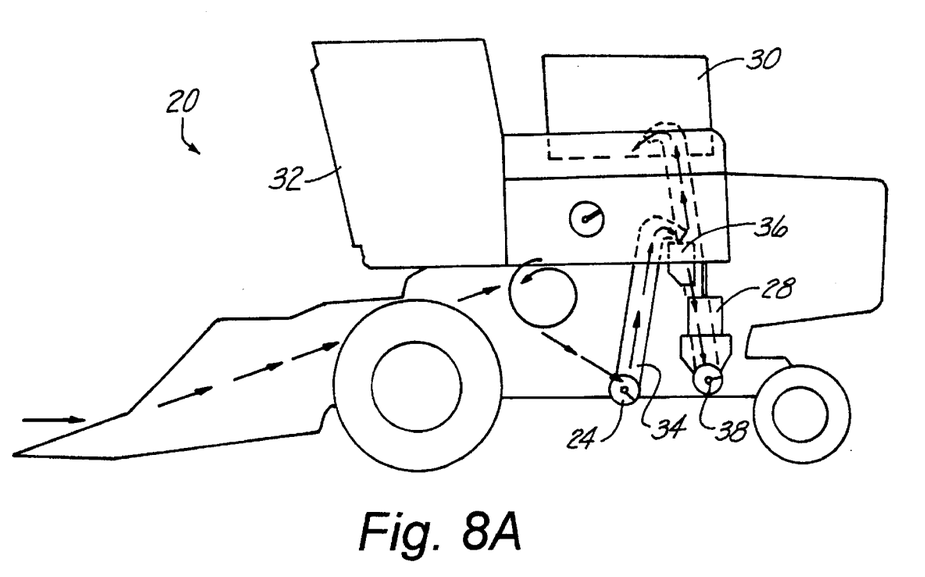
FIGS. 8A and 8B are side and top views, respectively, of a harvester of the present invention showing in schematic form the grain path through the modified harvester.
Figure 8B:
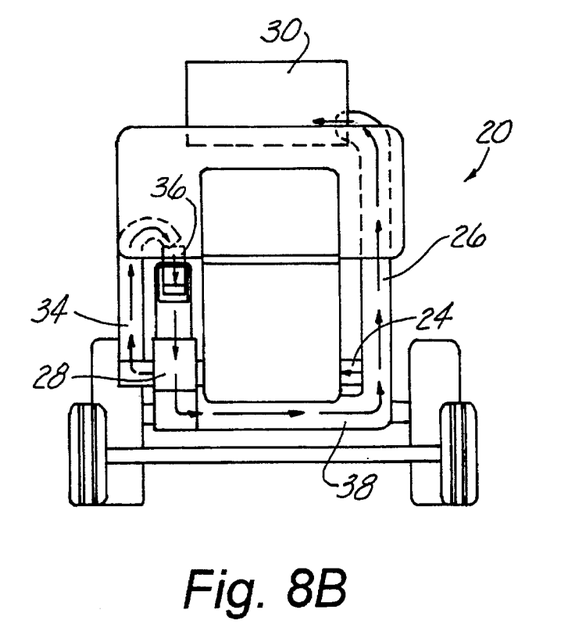

In the present invention, the clean grain path of the harvester 20 is substantially modified and a weigh bucket 28 is moved to a low position inside the vertical confines of the harvester 20 (FIGS. 8A and 8B). The clean grain is again deposited in a lateral conveyor 24 which is the same lateral conveyor 24A except that it is operated in the opposite direction to convey clean grain to the left-hand side of the harvester 20. The clean grain is then transferred upwardly by a left vertical conveyor 34 which discharges the clean grain into a holding bin 36. After all of the grain from a strip test plot has been harvested, cleaned, and delivered to the holding bin 36, the collected grain is discharged into the weigh bucket 28 for weighing and moisture measurement. After the measurements are completed, the grain is discharged into a second lateral conveyor 38 which transports the grain to the right side of the harvester 20 where it is moved upwardly by a right vertical conveyor 26 into the clean grain tank 30.

The clean grain path prior to the weigh bucket 28 in the harvester 20 which incorporates the present invention has been shortened substantially over the clean grain path of the harvester 20a of the prior art. Accordingly, the dwell time between successive strip test plots has been reduced to between about 5 and about 10 seconds. Additionally, by moving the weigh bucket 28 from a high position above the clean grain tank 30 to a low position within the vertical confines of the harvester 20, the overall height of the harvester is reduced to its original factory height such that the harvester can now be legally transported on the highway and will pass under doors and the like of typical storage sheds without requiring removal or displacement of the weigh bucket.

Figures 2A, 2B:
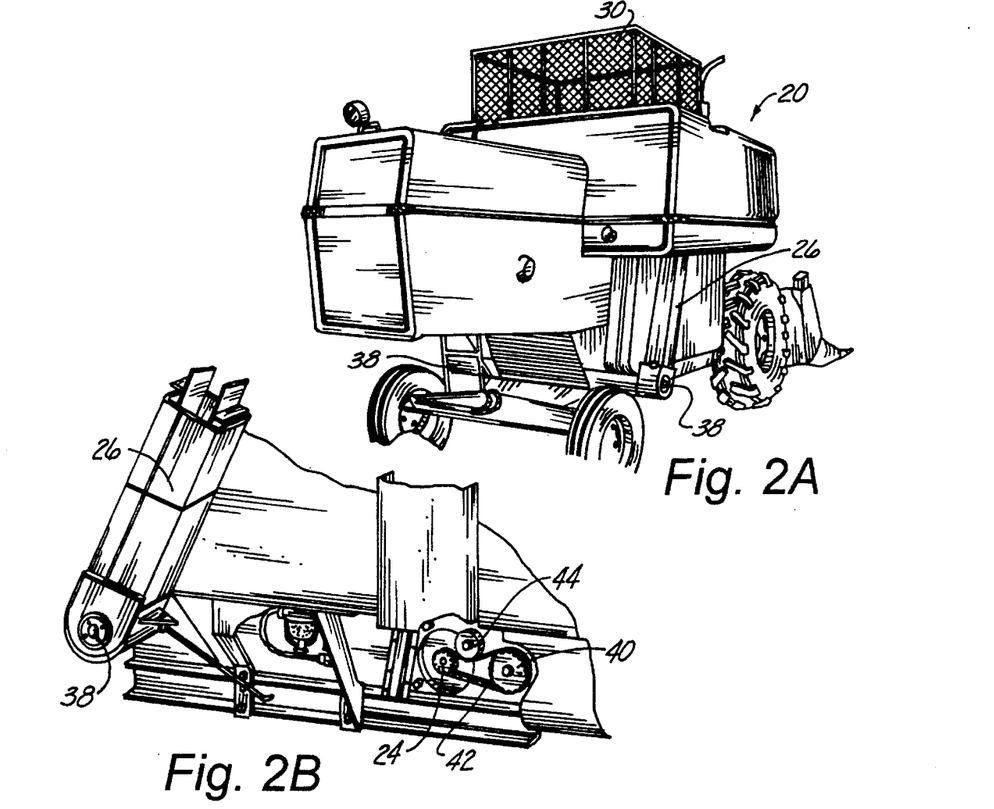
FIG. 2A is a rear perspective view of the opposite side of the harvester of FIG. 1.
FIG. 2B is an enlarged view of a portion of FIG. 2A wherein a portion is broken away to show drive elements.
Figure 3:
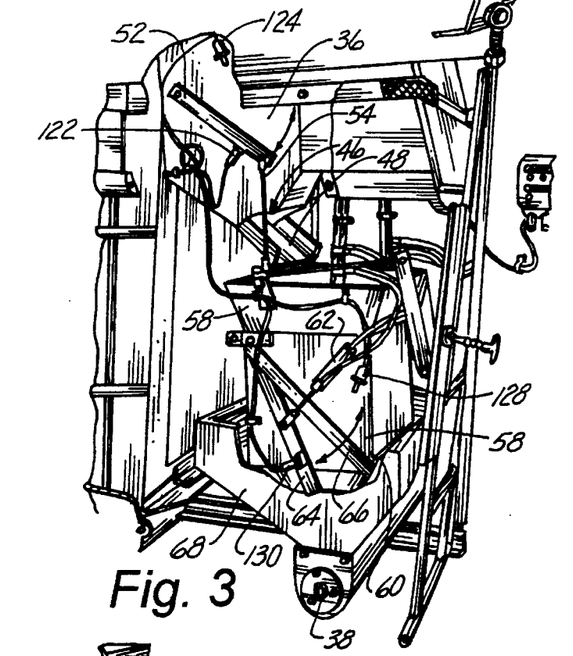
FIG. 3 is a side view of the weigh bucket in a condition for collecting grain.

As discussed above, the harvester 20A is modified by reversing the direction of rotation of the first lateral conveyor 24A. As illustrated in FIG. 2, the right side end portion of the auger 24 is connected to a drive shaft 40 of the harvester 20 by a chain 42 and idler pulley 44. With this arrangement, the auger 24 is rotated in the opposite direction so as to convey clean grain to the left-and side of the harvester 20 as opposed to the right-hand side. A left vertical conveyor 34 is positioned on the left-hand side of the harvester 20 to receive grain from the lateral conveyor 24 and transport it upwardly (FIG. 1). Grain from the left vertical conveyor 34 is discharged into the holding bin 36 where it is collected and held until all of the grain collected from each strip test plot has been processed by the harvester 20. The holding bucket 36 has a bottom discharge opening 46. The discharge of grain from the holding bin 36 is regulated by a discharge chute 48 that is attached for pivotal movement at the bottom of the holding bin 36 (FIG. 3). Opening and closing of the chute 48 is accomplished by a hydraulic cylinder 50 which moves a pivot arm 52, the free end portion of which is interconnected to the discharge chute 48 by an interconnecting rod 54.

Figure 4:
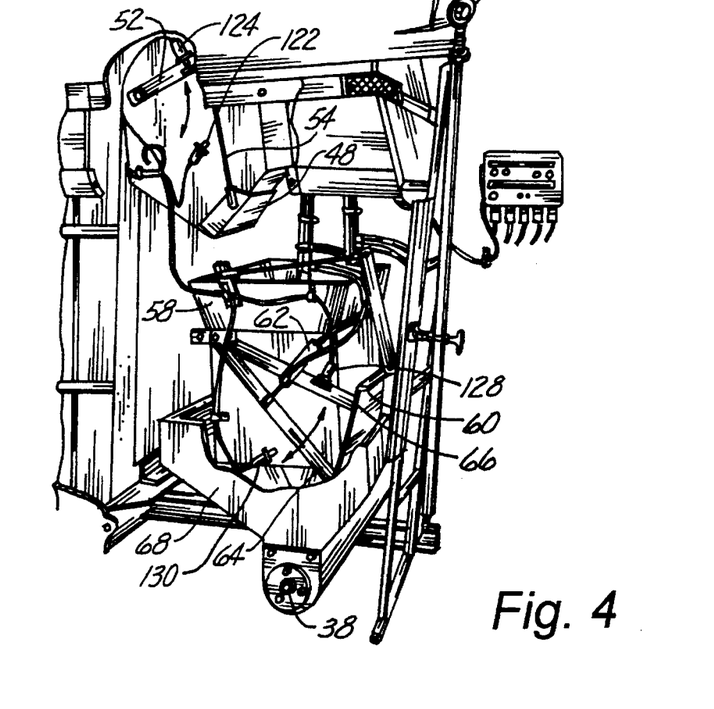
FIG. 4 is a side view of the weigh bucket of FIG. 3 in a condition for discharging grain.

Upon discharge from the holding bin 36, the grain is directed by the chute 48 into a weigh bucket bin 58 that is a part of the weigh bucket 28. As will be described in more detail below, the grain held in the weigh bucket bin 58 is weighed and its moisture measured. After being weighed and measured, the grain is discharged from the weigh bucket bin 58 through a bottom opening which is selectively opened and closed by a door 60. The door 60 is mounted for pivotal movement relative to the weigh bucket 58 by two pair of linkage arms, the left-hand side pair being illustrated at 64 and 66, respectively, in FIGS. 3 and 4. The door 60 is moved between its opened and closed positions by a hydraulic cylinder 62 that is pivotally connected to mounting arm 64. The door 60 is held in its closed position while the collected grain is being weighed and measured. The door 60 is then moved to its open position (FIG. 4) and the grain is discharged into a hopper 68 which feeds into the second lateral conveyor 38.

The second lateral conveyor 38 transports the weighed and measured grain to the right-hand side of the harvester 20 where it is delivered to the right vertical conveyor 26 (FIG. 2) for delivery to the clean grain tank 30.

Figures 5A, 5C:
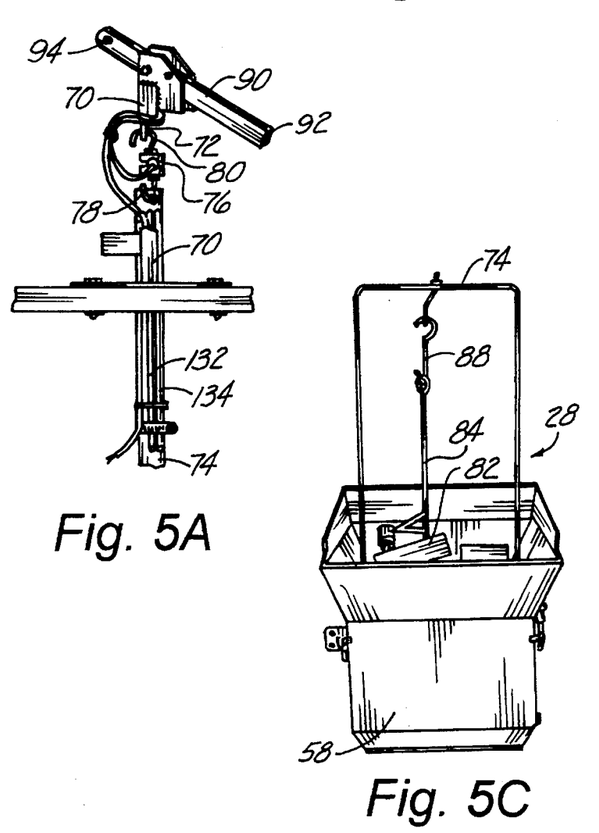
FIGS. 5A–5D are partial perspective views of the weigh bucket and an associated suspension frame for mounting the weigh bucket onto the harvester.
Figure 5B:
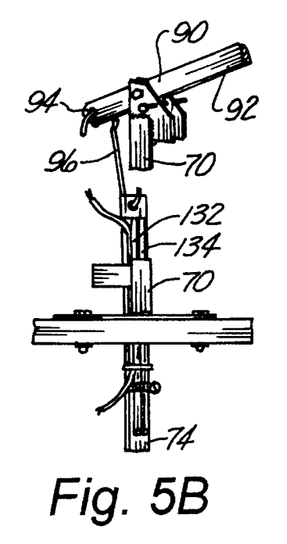
Figure 5D:
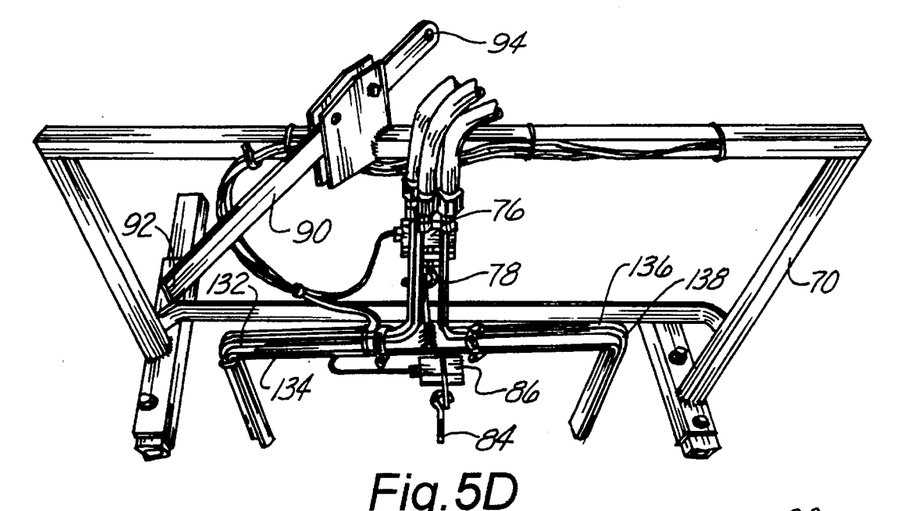

The weigh bucket 28 is attached to the harvester 20 by suspension from a frame 70, as illustrated in FIGS. 5. The suspension frame 70 is rigidly secured to the harvester 20 and the weigh bucket 28 is suspended from the frame 70 at mounting hole 72. The weigh bucket 28, accordingly, can move laterally in any direction.

The weigh bucket 28 includes a support frame 74 that is rigidly attached to and extends upwardly from the weigh bucket bin 58. During use, the support frame 74 is interconnected to the suspension frame 70 through a large capacity load cell 76 and a pair of hooks 78 and 80. Accordingly, the full weight of the weigh bucket 28 is carried by the large capacity load cell 76.

A smaller sample bucket 82 is suspended inside the weigh bucket bin 58. The sample bucket 82 includes an upwardly extending rod 84 which is interconnected to the support frame 74 through a small capacity load cell 86. The full weight of the sample bucket 82 and its contents, accordingly, are supported through the small capacity load cell 86 so that its contents can be weighed during use. The sample bucket 82 is, likewise, free to move laterally in any direction about its mounting point to the support frame 74.

While the load cells 76 and 86 are selected to be of a size to accommodate the loading expected during use of the harvester in collecting strip test plot grain, more accurate results can be obtained by selecting a load cell capacity that is not excessively greater than the weight that is expected to be measured. Because the load cells can be ruined if subjected to a weight substantially greater than their capacity, means has been provided to remove the weight of the weigh bucket and sample bucket off of their respective load cells during transport and storage of the harvester 20.

A hook 88 is attached to the support rod 84 and can be moved manually to connect the sample bucket 82 directly to the support frame 74, thereby taking the weight of the sample bucket 82 off of the load cell 86. Because the weight of the weigh bucket 28 is more than can be easily lifted manually, a lever 90 is pivotally attached to the suspension frame 70. The lever 90 has a handle end portion 92 and an opposite end portion 94. A hook 96 is mounted to the support frame 74 of the weigh bucket 28. When it is desired to take the weight of the weigh bucket 28 off of the large capacity load cell 76, the hook 96 is attached to the opposite end portion 94 of the lever 90. The handle portion 92 can then be moved manually downwardly to raise the weigh bucket 28 relative to the suspension frame 70 and the lever 90 held in its raised position by pin 93 inserted through the suspension frame 70 above the lever 90 to remove the weight of the weigh bucket 28 off of the large capacity load cell 76.

Figure 6A:
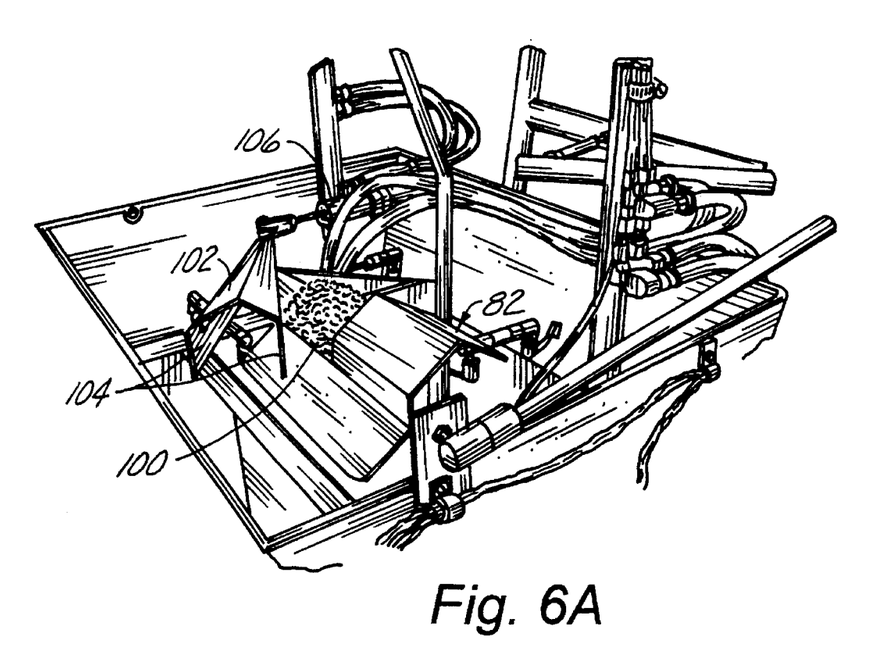
Figure 6B:
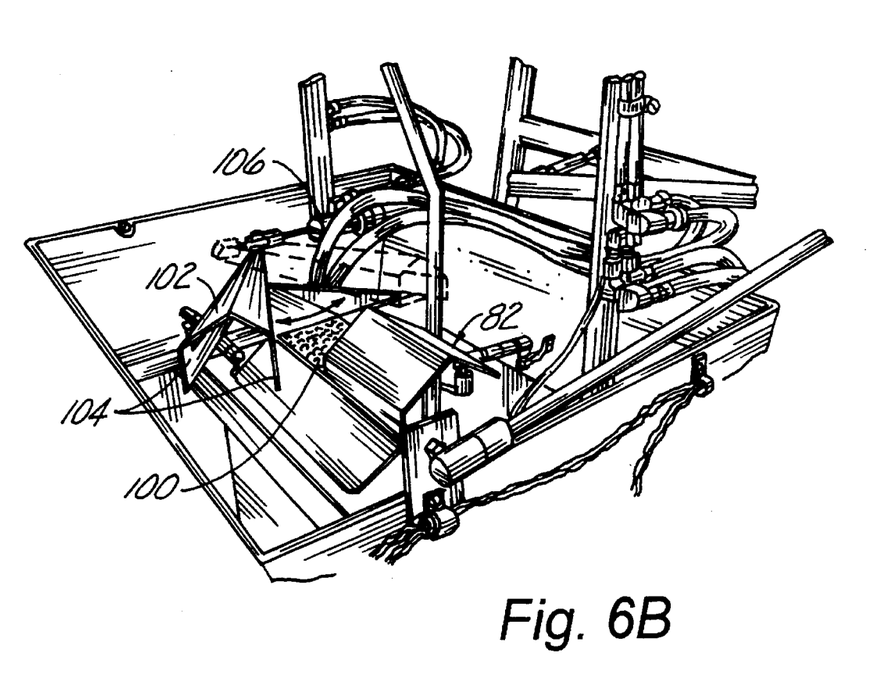

The sample bucket 82, as discussed above, is suspended from the support frame 74 inside the weigh bucket bin 58. The sample bucket 82 has an open top 100 (FIGS. 6A and 6B) and a bottom discharge opening that is selectively covered by a pivotable door (not shown) that is controlled by hydraulic cylinder 112 in a manner similar to the holding bin 36 and the weigh bucket bin 58. Accordingly, as grain is discharged from the holding bin 36, it will fill the sample bucket 82. The sample bucket 82 is calibrated to hold a predetermined volume of grain against which the weight measured in the small capacity load cell 86 is compared. The weigh bucket 82 also includes a moisture sensor for determining the moisture content of the grain sample inside the sample bucket 82. By positioning the opening 100 of the sample bucket 82 in the outflow stream of grain from the holding bin 36, it is assured that the sample bucket 82 will be filled to capacity during each cycle. So that an equal volume of grain is always in the sample bucket 82, an hydraulically actuated swipe arm 102 is mounted for pivotal movement across the opening 100. The swipe arm 102 includes a pair of pliable wiping members 104 which are in contact with the upper surface of the weigh bucket 82 around the periphery of the opening 100 during swiping action of the swipe arm 102. The swiping action is accomplished by a hydraulic cylinder 106 that is pivotally connected to an end portion of the swipe arm 102. Accordingly, extension and retraction of the hydraulic cylinder 106 will result in pivotal movement of the swipe arm 102 from the solid line position shown in FIGS. 6A and 6B to the dotted line position shown in FIG. 6B. The hydraulic cylinder 106 is actuated through a complete extension and retraction cycle following the discharge of grain from the holding bin 36 and prior to the weight and moisture measurements being taken of the grain in the sample bucket 82.

Figure 9:
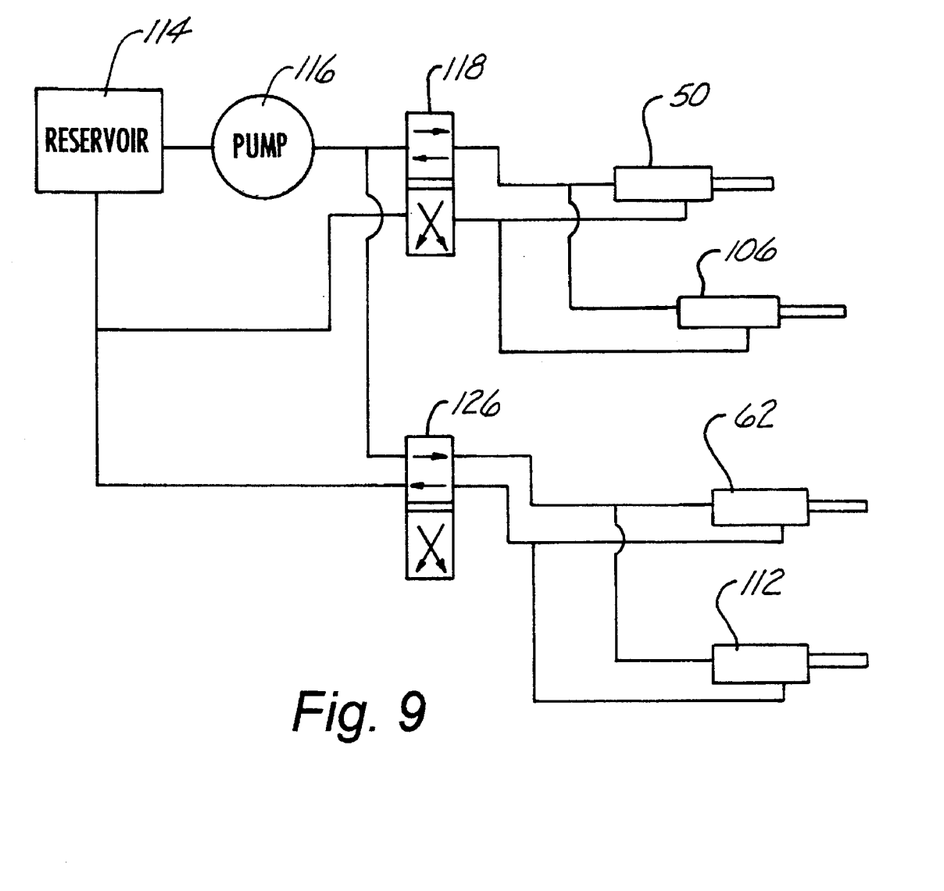
FIG. 9 is a schematic diagram of hydraulic circuitry of the present invention.

The four cylinders 50, 62, 106 and 112, are connected to a supply of pressurized hydraulic fluid including reservoir 114 and pump 116 (FIG. 9). Extension and retraction of cylinder 50 to open and close the discharge chute 48 of the holding bin 36 is controlled by an electronic solenoid valve 118. Similarly, extension and retraction of cylinder 106 to pivot the swiper bar 102 is controlled by an electrically actuated solenoid valve 120. Upper and lower limit switches 122 and 124, respectively, are positioned on the outer side wall of the holding bin 36 in a position so as to be contacted and actuated by the pivot arm 52 corresponding to the closed and opened positions of the discharge chute 48, respectively. Actuation of the limit switches 122 and 124 will result in movement of the electrically actuated solenoid valve 118 from its respective open position to its closed position. Accordingly, the supply of pressurized hydraulic fluid to the cylinder 50 will be interrupted upon contact of the pivot arm 52 with the respective limit switch 122 and 124.

Both hydraulic cylinders 62 and 112 are connected through a single electrically actuated solenoid valve 126 so that the cylinders 62 and 112 act together to either close the bottom of the sample bucket 82 and the weigh bucket bin 58 or open both for discharge after the weighing and measuring process is completed. As with the discharge chute 48 of the holding bin 36, a pair of limit switches 128 and 130 are positioned on the side of the weigh bucket bin 58 at a position to define the open and closed positions, respectively, of the door 60.

The accuracy of the measurements taken by the load cells will be improved if the weigh bucket and sample bucket are isolated from the vibrations and other movements and forces of the harvester 20. The effect of such forces is reduced by the mounting structure used for the weigh bucket 28 and the sample bucket 82 which permits a free range of lateral movement of each relative to its attachment point. Accordingly, the weigh bucket bin 58 is sized to accommodate the entire volume of collected grain from each strip test plot at a level below the bottom most end point of the sample bucket so that the sample bucket is free to move about its pivot point even when grain is present in the weigh bucket bin 58. While free movement is desired, movements of large amplitude can create significant forces which may create errors in the weight measurements. Accordingly, the weigh bucket 28 is loosely linked to adjacent structure of the harvester 20 through a number of pivoted linkages, some of which are damped to absorb much of the undesired forces and reduce the amplitude of movement of the weigh bucket relative to the suspension frame.

Errors in the weighing measurement can also be induced by forces on the weigh bucket due to changes in hydraulic pressure in the hoses which connect to the cylinders during operation of the cylinders. In the present invention, the hydraulic lines which feed pressurized hydraulic fluid to the cylinders 62, 106, and 112, comprise a pair of feed and return lines 132 and 134 for cylinders 62 and 112 and a pair of feed and return lines 136 and 138 for cylinder 106 (FIG. 5). The lines 132–138 are fed from a central location above the support frame 74. Lines 132 and 134 are in contact with a left side of the support frame 74 and lines 136 and 138 are in contact with a right-hand side of the support frame 74. This arrangement reduces the forces that may be induced on the weigh bucket due to changes in hydraulic fluid pressure and flow through the lines during operation of the hydraulic cylinders.

A complete operational cycle of the harvester 20 through a strip test plot will now be described. With the harvester 20 in operation, the operator will advance the harvester 20 into the strip test plot to harvest the ears of corn from the stalks at the beginning of the strip test plot. The ground travel of the harvester 20 is stopped when all of the ears of corn have been harvested off of the strip test plot and before the harvester 20 has entered the succeeding strip test plot. The operator, by listening to the operation of the harvester 20, waits until all of the harvested ears have been husked, shelled, cleaned, and conveyed to the holding bin 36. Alternatively, a small video camera can be mounted on the harvester with a view of the sample bucket 82 and a video screen in the operator's cab to allow the operator to monitor visually the transfer of grain from the holding bucket to the weigh bucket. The operator then actuates the solenoid valve 118 to discharge the clean grain into the sample bucket 82 and weigh bucket 28, and to move the swiper bar 102 across the top opening 100 of the sample bucket 82, to the position shown in broken line in FIG. 6A. The solenoid valve 118 is then reversed to close the discharge chute 48 and to return the swiper bar 102 tack across the top opening 100 of the sample bucket 82, to the position shown in solid line in FIGS. 6A and 6B. The harvester 20 is advanced into the succeeding strip test plot. The readings from both load cells 76 and 86 are taken as well as the moisture measurement of the grain sample in the sample bucket 82. The solenoid valve 126 is then actuated to open the door of the sample bucket 62 and the door 60 of the weigh bucket bin 58. The grain will then be transported through the second lateral conveyor 38 and right vertical conveyor 26 to the clean grain tank 30 where it is commingled with the grain from other strip test plots.

Figure 10:
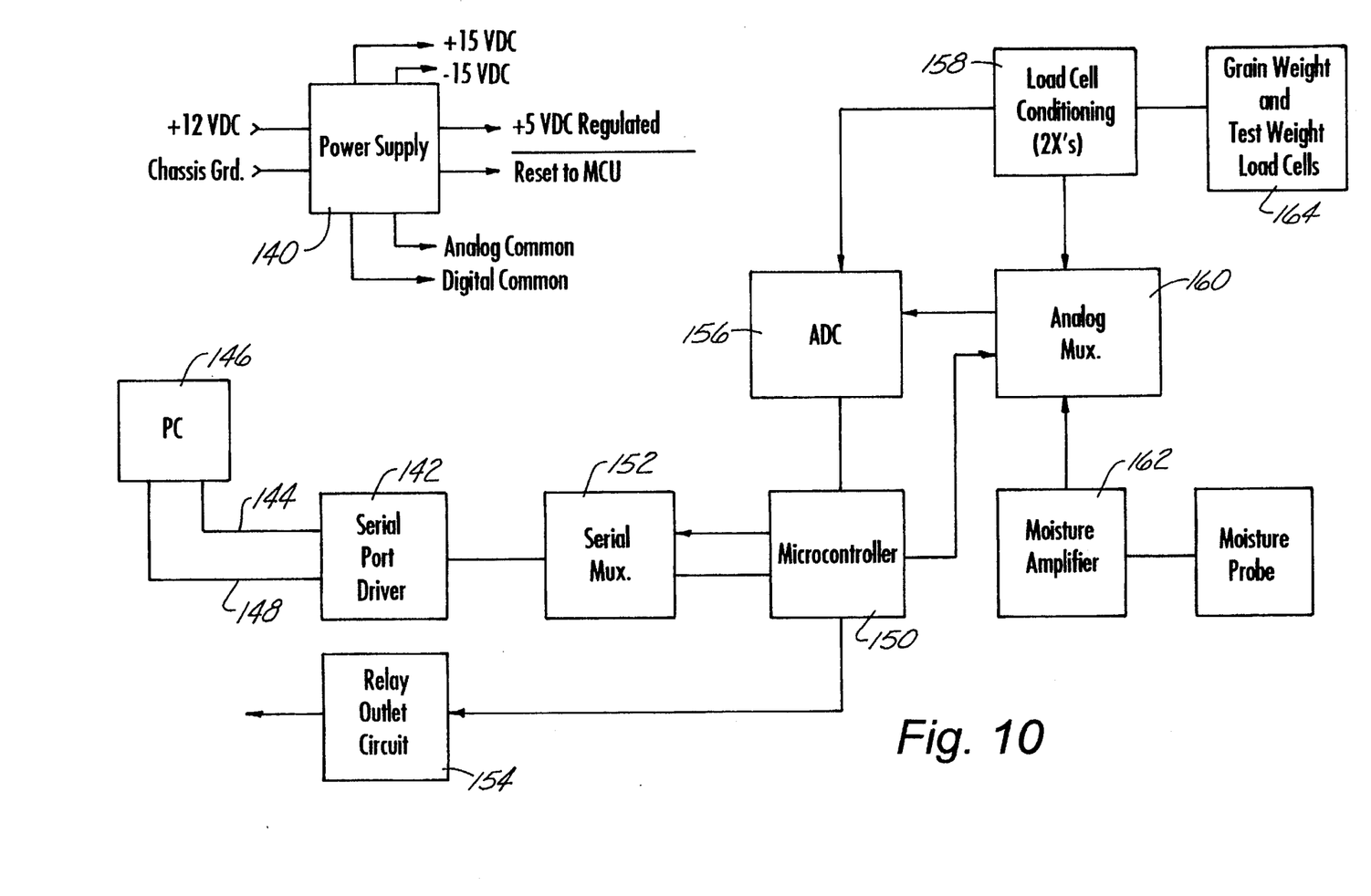
FIG. 10 is a schematic block diagram of the electrical control circuitry of the present invention.

Although the actuation of the hydraulic cylinders can be performed manually, the present invention includes an automatic controller that can be programmed to carry out these functions automatically. A schematic block diagram of the electrical control circuitry is illustrated in FIG. 10. The electrical control circuitry includes a power supply 140 that is connected to the 12-volt DC power of the harvester. The power supply 140 includes a 12-volt DC regulator which is used to regulated the supply voltage applied to the relay coils and to a DC to DC converter and a 5-volt DC regulator. The DC to DC converter provides plus and minus 15 volts DC for the analog portion of the control circuitry as will be described later. The 5-volt DC regulator provides supply voltage for the digital control circuitry as will be described later.

A serial port driver 142 is used to provide the level shifting functions required for an RS232 serial interface. The inputs of the serial port driver 142 are a command port 144 which is used to exchange commands and measurement results with a portable computer 146 and a printer port 148 which is used to print information as directed by the portable computer 146. The serial port driver 142 is connected to a microcontroller 150 through a serial multiplexer 152. The multiplexer 152 demultiplexes data from the microcontroller 150 to the ports of the serial port drive 142 and multiplexes data from the ports of the serial port driver to the receive input of the microcontroller 150.

The microcontroller 150 in the preferred embodiment is a Motorolla MC68HC811E2P microprocessor. The microcontroller 150 includes 256 bytes of on-board RAM, 2048 bytes of ROM, serial and parallel input/output functions, and an 8-bit analog digital converter. The microcontroller 150 is connected to a relay output circuit 154, which includes two relays to provide normally open and normally closed contacts rated at 15 amps DC for actuation of the solenoid valves 118 and 126. The relays are under control of the microcontroller 150 through optical isolators. In the preferred embodiment, the relays are Potter Boumfield T-90 series relays and the optical isolators are Texas Instruments Model 111.

The microcontroller 150 is also connected to an analog to digital converter 156. The reference voltage for the analog to digital converter 156 is derived from the excitation voltage applied to the strain gauge load cells 76 and 86. The analog to digital converter 156 receives the output of a load cell conditioning circuit 158. Included within the load cell conditioning circuit 158 are wide band width strain gauge signal conditioner modules which are used to provide the amplification, excitation, and filtering functions required to interface with the strain gauge load cells 76 and 86. A low pass cut-off frequency of 1 hertz is used and the voltage gain is set at 120 to produce a full scale input to the analog to digital converter 156 when the force applied to either of the load cells 76 and 86 is at 94 percent of its rated load. In the preferred embodiment, the conditioner modules are sourced from Analog Devices, Model 1B31.

The weight signals from the load conditioning circuit 158 are output to an analog multiplexer 160 which is used to provide the analog to digital converter 156 with analog voltages from the load cell conditioning modules and from a moisture amplifier 162. The signal selected at any given time to be communicated to the analog to digital converter 156 is controlled by the microcontroller 150.

The moisture amplifier 162 is constructed from an LF444 quad op amp IC. The amplifier converts the double-ended input signal from the moisture probe 164 to a single-ended output and also provides buffering and amplitude control. Suitable commercially available moisture probes can be purchased from either Carter Manufacturing or ALMACO. These probes have a balanced analog output voltage typically ranging from −200 mV to 6.30 volts maximum measured voltage. The gain was set at 0.56 so that the maximum moisture amplifier output voltage is approximately 3.5 volts. This rather conservative full scale output was selected due to the large output voltage variations (from between about 5.6 volts through about 6.30 volts) observed in the probes that were tested. The 10 volt DC (nominal) supply voltage required by the moisture probe is provided by the excitation voltage output of the load cell conditioning circuitry 158.

The reference voltage for the analog to digital converter 156 and the excitation voltages of the load cells 76 and 86 are all derived from the reference voltage of the load cell conditioning circuitry 158. If the reference voltage of the load cell conditioning circuitry 158 were to increase, say 1 percent, then the load cell excitation voltages would increase 1 percent, the load cell outputs would increase 1 percent, and the reference voltage of the analog to digital converter 156 would increase 1 percent. Because the analog to digital converter 156 would increase 1 percent. Because the analog to digital converter 156 effectively measures the ratio of an input voltage to its reference voltage, the conversion result will remain unchanged. This ratiometric weight measurement eliminates the need for an extremely accurate voltage reference.

The electrical circuitry responds to a simple set of commands received via its command port 144 (9600 baud, 8 data bits, 1 stop bit, no parity). All commands are represented by a single ASCII character. The electrical circuitry ignores any characters it receives which are not valid command characters. The commands sent to the electrical control circuitry from the portable computer 146 are responded to with either a "0" or a "1" character followed by a carriage return, line feed sequence. The electrical control circuitry responds with a "0" if the input voltage to its +5 volt regulator is within specified limits, otherwise, it responds with a "1." If the portable computer 146 receives this response, it can assume that the command character was successfully received by the electrical control circuitry. Any additional information required by the command is sent next. When the command is completely specified, it is executed and, upon completion, a final carriage return, line feed sequence is sent to the portable computer 146.

Analog data is sent by the control circuitry as a string of 3, 5 digit decimal values in the range of −16383 to +16383. The first value represents the test weight from the sample bucket 82, the second value the grain weight from the weigh bucket 28, and the third value represents the moisture. Conversion of these raw values into their respective weights and moisture is accomplished by the portable computer 146.

The electrical circuitry also calculates a time-weighted average of the scan results of both weight channels. A new average value, A(n+1), is determined from the previous average value, A(n), the latest scan result, R, and a weighting constant, C, according to the following formula: $A(n+1) = [C \times A(n) + R] \div [C+1]$. If the value of C is too large, the electrical control circuitry will respond too slowly to changes in weight. If the value of C is too small, the weight indication will change in response to motion/vibration of the harvester and appear to be erratic. It has been found that a setting of C=8 provides satisfactory results. If the latest scan result differs from the old average by more than 25 percent, the latest scan result is stored as the new average value. This improves the response time when grain is dumped into a weigh bucket.

No data is stored at the electrical control circuitry, but rather it is transmitted to and stored at the portable computer 146. This avoids the redundant storage of data at the electrical control circuitry as is common in commercial units. Additionally, known commercial units display measurement results directly, thereby requiring display hardware, floating point arithmetic capability and an input device such as a keyboard or the like. Since these functions are provided by the portable computer 146, they are removed from the electrical control circuitry of the present invention thereby decreasing its cost and complexity. The operator of the harvester thereby interacts with a portable computer which is conveniently located in the operator cab of the harvester. The electrical control circuitry is most heavily interconnected with the two load cells and the moisture sensor so that locating the electrical control circuitry near the weigh bucket reduces the amount of wiring required on the harvester thereby reducing the time and cost of installation. By keeping the length of small, signal-bearing wire short, the possibility of electrical interference is reduced. Further, only a serial communications cable is required between the electrical control circuitry near the weigh bucket and the portable computer in the operator's cab.

Although the invention has been described with respect to a preferred embodiment thereof, it is to be also understood that it is not to be so limited since changes and modifications can be made therein which are within the full intended scope of this invention as defined by the appended claims.

We claim:

1. A harvester for collecting and measuring grain constructed from a conventional harvester which moves the grain laterally of the conventional harvester and then upwardly for discharge into a weigh bucket repositioned above a clean grain reservoir, the harvester comprising:

(a) lateral conveying means for moving grain to a side of the harvester;

(b) conveying means for conveying grain from said lateral conveying means upwardly to a discharge;

(c) a weigh bucket positioned below the clean grain reservoir for receiving grain from the discharge of said conveying means;

(d) means associated with said weigh bucket for measuring at least one physical characteristic of a sample of grain in said weigh bucket; and (f) means for conveying grain from said weigh bucket to the clean grain reservoir.

2. A harvester as defined in claim 1, wherein the conventional harvester moves the grain to a first side of the harvester and wherein said lateral conveying means moves the grain to the second, opposite side of the harvester.

3. A harvester as defined in claim 2, wherein the conventional harvester includes an auger which is operated in a first direction to move the grain to said first side of the harvester and wherein said lateral conveying means includes said auger operated in a direction opposite to said first direction.

4. A harvester as defined in claim 2, wherein said means for conveying grain from said weigh bucket to the clean grain reservoir includes second lateral conveying means for moving the grain to the first side of the harvester and upward conveying means for moving the grain upwardly from said second lateral conveying means to the clean grain reservoir.

5. A harvester as defined in claim 1, further comprising means for suspending said weigh bucket from the harvester for free swinging movement of said weigh bucket.

6. A harvester as defined in claim 5, wherein said suspension means includes a yoke in assembly relation with said weigh bucket, and wherein said yoke hangs from a single mounting point on the harvester.

7. A harvester as defined in claim 6, further comprising hydraulic fluid supply and return lines for interconnecting said weigh bucket and the harvester, wherein said hydraulic lines are routed adjacent said mounting point and along said yoke.

8. A harvester as defined in claim 5, further comprising means to damp the swinging movement of said weigh bucket.

9. A harvester for collecting and measuring grain from a plot, the harvester being constructed from a conventional harvester having a lateral conveyor for conveying grain laterally to a first side of the harvester, a clean grain reservoir, and a conveyor for conveying grain from said lateral conveyor upwardly to the reservoir, the harvester comprising:

(a) a weigh bucket positioned generally below said reservoir and on a second, opposite side of the harvester;

(b) means for operating said lateral conveyor to convey clean grain in an opposite direction to said second opposite side of the harvester instead of conveying grain to said first side;

(c) means for conveying grain from said lateral conveyor upwardly for discharge into said weight bucket;

(d) means associated with said weight bucket for measuring at least one physical characteristic of the grain in the weigh bucket; and (e) means for conveying grain from said weigh bucket to the reservoir.

10. A harvester as defined in claim 9, wherein said means for conveying grain from said weigh bucket to the reservoir includes:

(a) a second lateral conveyor for conveying grain from said weigh bucket to said first side of the harvester; and (b) means for conveying grain from said second lateral conveyor upwardly to the reservoir.

11. A harvester as defined in claim 9, further comprising means for suspending said weigh bucket from the harvester for free swinging movement of said weigh bucket.

12. A harvester as defined in claim 11, wherein said suspension means includes a yoke in assembly relation with said weigh bucket, and wherein said yoke hangs from a single mounting point on the harvester.

13. A harvester as defined in claim 12, further comprising hydraulic fluid supply and return lines for interconnecting said weigh bucket and the harvester, wherein said hydraulic lines are routed adjacent said mounting point and along said yoke.

14. A harvester as defined in claim 11, further comprising means to damp the swinging movement of said weigh bucket.

15. A harvester as defined in claim 1, further comprising:

(a) an operator's cab;

(b) means for controlling the operation of the weigh bucket positioned at said side of the harvester adjacent said weigh bucket; and (c) means inside the operator's cab for storing said measurements of said at least one physical characteristic.

16. A harvester as defined in claim 15, wherein said means for storing said measurements includes a digital processor and memory.

17. A harvester as defined in claim 16, wherein said means for controlling the operation of said weigh bucket is incapable of storing said measurements.

18. A harvester for collecting and measuring grain from a plot, the harvester being different than a conventional harvester which has a lateral conveyor for conveying grain laterally to a first side of the conventional harvester, a clean grain reservoir, and a conveyor for conveying grain from said lateral conveyor upwardly to the reservoir, the harvester having a first side being the same side as the first side of a conventional harvester comprising:

(a) a weigh bucket positioned generally below a reservoir and on a second, opposite side of the harvester;

(b) means for operating said lateral conveyor in an opposite direction to convey clean grain to said second opposite side of the harvester;

(c) means for conveying grain from said lateral conveyor upwardly for discharge into said weight bucket;

(d) means associated with said weight bucket for measuring at least one physical characteristic of the grain in the weigh bucket; and (e) means for conveying grain from said weigh bucket to the reservoir.

* * * * *